United States Patent Office 2,948,757
Patented Aug. 9, 1960

2,948,757
TRIHYDROXY POLYOXYALKYLENE ETHERS OF GLYCEROL

Malcolm E. Pruitt and William A. Rogers, Jr., Lake Jackson, Tex., assignors to The Dow Chemical Company, Midland, Mich., a corporation of Delaware No Drawing. Filed Dec. 7, 1953, Ser. No. 396,773

9 Claims. (Cl. 260—615)

This invention relates to new trihydroxy polyoxyalkylene ethers of glycerol and a method for their preparation.

The new compounds of the invention are trihydroxy polyoxyalkylene ethers of glycerol in which the glycerol nucleus is substituted by polyoxyalkylene ether chains each of which consists of a polyoxy-1,2-propylene portion adjacent to the glycerol nucleus and a polyoxyethylene portion remote therefrom. These compounds are good non-ionic surface active agents, the glyceryl-polyoxy-1,2-propylene portion of the molecule being apparently repelled by water or hydrophobic in nature and the polyoxyethylene portion being attracted to water or hydrophilic. Since non-ionic surface active agents do not ionize but depend chiefly upon hydroxyl groups and ether linkages to create the hydrophilic chain, the new compounds of the invention are comparatively insensitive to hard water and electrolytes. More particularly, these compounds are good anti-foam agents, being surprisingly effective in exceedingly low concentrations in preventing or suppressing foaming in a wide variety of aqueous and non-aqueous systems.

An object of this invention is to prepare new trihydroxy polyoxyalkylene ethers of glycerol. A related object is to provide a process whereby these compounds can be prepared in good conversions and yields.

These and other objects are accomplished by first reacting glycerol with 1,2-propylene oxide to give polyoxy-1,2-propylene ethers of glycerol. These intermediates are reacted with ethylene oxide as hereinafter described. The two-step reaction is carried out under relatively moisture-free conditions in the presence of a suitable condensation catalyst such as an alkali metal hydroxide catalyst, e.g. sodium hydroxide or potassium hydroxide. The reaction may be conducted either batchwise or continuously as desired. In batchwise operation, commercially anhydrous glycerol, preferably greater than 99 percent pure, is charged into a suitable dry reaction vessel such as an autoclave and mixed with an effective amount of catalyst, usually 14 to 15 percent of alkali metal hydroxide based on the weight of glycerol. This represents less than 1.0, and usually less than 0.2 percent by weight of catalyst in terms of the total amount of reactants, including the weight of both alkylene oxides appearing in the reaction product. Prior to the introduction of 1,2-propylene oxide, the reaction vessel is advantageously flushed with a stream of dry inert gas, such as nitrogen, to remove any air or oxygen therefrom. The elimination of molecular oxygen from the reaction vessel is an important factor in obtaining colorless products and may, if desired, be carried out after adding glycerol and catalyst to the reaction vessel.

After these preliminaries, the reaction vessel is heated to bring the contents thereof to a temperature at which 1,2-propylene oxide will readily react with glycerol. Ordinarily a reaction temperature slightly in excess of 100° C. is satisfactory. Thereupon 1,2-propylene oxide is gradually added to the glycerol-alkali metal hydroxide solution under conditions of good mixing. Due to the exothermic nature of the reaction, it usually becomes necessary to remove excess heat from the reaction mixture to maintain the temperature of reaction below approximately 160° C. and preferably within the range of about 120° to 140° C. Under these conditions, the rate of addition of 1,2-propylene oxide is desirably such as to maintain a pressure of from about 30 to 40 pounds per square inch gauge in the reactor. The addition of 1,2-propylene oxide is continued until at least 30 and desirably from 40 to 80 parts by weight of 1,2-propylene oxide have been reacted per part by weight of glycerol. To prepare these intermediate trihydroxy polyoxy-1,2-propylene ethers of glycerol which may in turn be reacted with ethylene oxide to obtain products with exceptionally good anti-foaming properties, preferably 50 to 70 parts of 1,2-propylene oxide are employed per part by weight of glycerol.

When all of the propylene oxide has been added and reaction is substantially complete, ethylene oxide is added gradually to the reaction mixture at a rate such as to regulate the pressure at about 30 to 40 p.s.i.g. so as to again maintain the temperature in the range of from about 120° to 140° C. The addition of ethylene oxide is continued until from about 0.1 to about 0.4 of a part by weight of ethylene oxide has been reacted per part by weight of the intermediate material, i.e. the trihydroxy polyoxy-1,2-propylene ether of glycerol. Those of these final products which possess the best emulsifying properties result from reacting about 0.15 to 0.35 pound of ethylene oxide per pound of preferred intermediate material as defined above. After the predetermined proportion of ethylene oxide has been introduced into the vessel and condensation is essentially complete, the reaction product may be employed per se, e.g. as an anti-foaming agent. If desired, the alkali metal hydroxide in the reaction product may be neutralized, e.g. with glacial acetic acid, and the product purified somewhat by washing with water and removing volatile matter, if any, by fractional distillation at reduced pressure.

The product so prepared is, for the most part, a complex mixture of trihydroxy polyoxyalkylene ethers of glycerol in which the length of the hydroxy polyoxyalkylene chains vary considerably from one molecule to another in the mixture. In other words, a given product, having some particular viscosity, and hence a definite average molecular weight, is actually a complex mixture of molecular species with a considerable spread in individual molecular weights. However, all these trihydroxy polyoxyalkylene ethers of glycerol according to the invention are believed to have three polyoxy-1,2-propylene chains attached to the glycerol nucleus and three hydroxy polyoxyethylene chains in turn attached to the polyoxy-1,2-propylene chains.

The new trihydroxy polyoxyethylene-polyoxy-1,2-propylene ethers of glycerol may be defined in terms of the number of oxyalkylene groups which have been reacted per molecule of glycerol. Upon reacting an average of at least 48 oxy-1,2-propylene groups and an average of at least 6 oxyethylene groups per glycerol molecule, the advantageous anti-foaming properties of the new products begin to be obtained. This is an average of at least 54 oxyalkylene groups per glycerol nucleus. More frequently the anti-foaming compounds of the invention are prepared by reacting an average of from 63 to 126 oxy-1,2-propylene groups and an average of from 9 up to about 69 oxyethylene groups per glycerol molecule. This represents an average of at least 72 oxyalkylene groups per glycerol molecule. In all of these new trihydroxy polyoxyalkylene ethers of glycerol, the oxy-1,2-propylene groups should comprise greater than 66 mole percent but not more than about 89 mole percent of the total oxyalkylene groups. Unusually good foam suppressing compounds of the invention are obtained when an average of from 81 to 111 oxy-1,2-propylene groups and from 15 to 51 oxyethylene groups are reacted per glycerol molecule. In those compounds which exhibit optimum anti-foam properties, the oxy-1,2-propylene groups constitute from 68 to about 85 mole percent of the total oxyalkylene groups.

Since it is particularly difficult to determine the average molecular weights of the reaction products of the invention, i.e. the trihydroxy polyoxyalkylene ethers of glycerol, these products are best defined as hereinbefore stated in terms of the quantity of 1,2-propylene oxide and of ethylene oxide reacted with glycerol. From a practical standpoint, the quantity of each alkylene oxide is most conveniently expressed in terms of parts by weight, e.g. pounds. Accordingly those of these products which have been found to possess the best anti-foaming properties are formed by condensing 1 pound of glycerine with greater than 40 and preferably from 50 to 70 pounds of 1,2-propylene oxide and then with ethylene oxide. Since the amount of ethylene oxide to be reacted is dependent not only upon the initial weight of glycerol but upon that of the 1,2-propylene oxide condensed therewith, the amount of ethylene oxide so employed may conveniently be stated in terms of parts by weight based on the 1,2-propylene oxide-glycerol intermediate condensation product, preferably from 0.15 to 0.35 pound of ethylene oxide per pound thereof.

In making the non-ionic products of the invention, it is desirable that the starting materials contain as little water as possible in order to avoid undesirable side-reactions. In general, essentially anhydrous reaction conditions are employed, i.e. the combined reactants contain less than 0.2 percent and preferably less than 0.1 percent by weight of water. Commercially available glycerol of greater than 99 percent purity and containing less than 0.5 percent water is usually preferred for best results. Under optimum conditions, the moisture content of the alkylene oxide feed is ordinarily less than 0.1 percent for propylene oxide and less than 0.01 percent for ethylene oxide.

The catalysts which may be employed in the condensation reaction are those commonly known for the condensation of alkylene oxides with alcohols. Alkaline catalysts, especially alkali metal hydroxides or alkali metal alcoholates, are best. The proportion of catalyst is ordinarily quite small, from 0.1 to 1.0 percent by weight of the total reactants, usually 0.2 percent or less being adequate. For convenience, all of the catalyst for the entire reaction is ordinarily dissolved in the glycerol before the addition of alkylene oxide. More catalyst can be added in the closing stages of any condensation which tends to become sluggish.

The temperature at which the condensation proceeds is fairly critical and should be in the range between about 100° C. and 160° C. In most instances, a temperature of at least 120° C. is required to secure acceptable reaction rates, particularly in making products of high molecular weight. On the other hand, above 140° C. there is a tendency for objectionable discoloration of the product. Since the condensation, once under way, is highly exothermic, cooling can be applied with advantage. Even with strong cooling, it is important to introduce the alkaline oxides gradually to avoid over-heating. In general, the operating pressure produced by the addition of alkylene oxide should be held in the range of 10 to 50 pounds per square inch gauge, with pressures over 100 pounds being carefully avoided to prevent the reaction from getting out of control. The alkylene oxide may be fed into the reaction vessel either as a gas or liquid as desired. Vigorous agitation is desirable to maintain a good dispersion of the catalyst and uniform reaction rates throughout the mass.

The course of the condensation can be followed roughly by consecutively metering in each alkylene oxide until the desired amount has been added. Agitation at a reaction temperature is continued until the pressure falls to a low value. The final reaction product may then be cooled, neutralized if desired, and removed. The approximate average molecular weights of these products may be determined by measuring the weight percent of hydroxyl group (—OH) present (by acetylation) and reckoning three free hydroxyl groups per molecule. In general, these mixtures of trihydroxy polyoxyalkylene ethers of glycerol have from about 1.5 to about 3.0 weight percent OH as determined by acetylation and average molecular weights (by acetylation) in the range of from about 1700 up to about 3500.

The products of the invention are virtually non-volatile, water-white to amber liquids which are exceptionally miscible with benzene and a wide variety of aromatic compounds. They are also soluble in aliphatic and cycloaliphatic solvents such as acetone, carbon tetrachloride, ethanol, cyclohexanol, and the like but are only slightly soluble in water. These liquid products are stable in air, do not deposit gummy residues on heating, and are not corrosive towards metals. Unlike many other surface active materials, they have low oral toxicity and low skin absorptivity. As previously stated, these compounds are useful as foam suppressing and dispersing agents in a wide variety of aqueous and non-aqueous systems. When added to aqueous process liquids for the purpose of preventing or suppressing foam, they permit continuous heating of the liquids during distillation, condensation, polymerization, esterification, hydrolysis, evaporation, and other heating operations, and allow more efficient use of process equipment such as kettles, stills, tanks, etc. These compounds also prevent foaming frequently encountered in the circulation and mechanical mixing of solutions, especially heated solutions, which are particularly apt to foam such as soap solutions and heat exchange solutions, e.g. in the cooling systems of automobiles. Foaming in non-aqueous systems, e.g. in the manufacture of varnishes, may also be suppressed with these new trihydroxy polyoxyalkylene ethers of glycerol.

Within the limits of the invention, the viscosities and other properties of the new liquid reaction products of glycerol can be varied to suit particular end uses by controlling the number of moles of propylene oxide and of ethylene oxide employed in the condensation reaction. The viscosities of these product mixtures usually fall within the range of from about 250 up to to about 400 centistokes at 100° F.

*Example 1*

The following procedure describes the preparation of one of the glyceryl trihydroxy polyoxyalkylene ether products of the invention.

Into a steel reaction vessel purged with dry nitrogen was charged 1.0 part by weight of commercial anhydrous glycerol of greater than 99.5 weight percent purity and 0.67 part by weight of potassium hydroxide pellets. The vessel was pressured with dry nitrogen to 75 pounds per square inch gauge and tested for leaks. Heat was then applied to the reactor and the temperature gradually brought to about 125° C. Thereupon, the pressure was bled down to about 3 p.s.i.g. and 1,2-propylene oxide containing less than 0.1 weight percent water was added gradually to the well-agitated glycerol-potassium hydroxide mixture at a rate such as to maintain the pressure between 30 and 50 p.s.i.g. and the temperature at about 125° C. The addition of 1,2-propylene oxide was continued for a period of about 14 hours until approximately 65.0 parts of 1,2-propylene oxide had been added per part by weight of glycerol. Thereafter the resultant reaction mixture, occupying approximately three-fourths of the volume of the steel vessel, was digested at about 125° C. for 30 minutes. A small sample of this reaction product was withdrawn at the end of the digestion period. This product was a clear, light amber liquid which was tested and found to be ineffective as an antifoaming agent in a 50 volume per cent aqueous solution of a commercial anti-freeze formulation containing approximately 90 percent by weight of ethylene glycol.

Ethylene oxide containing less than 0.01 weight percent water was then passed gradually into the well-agitated glycerol-1,2-propylene oxide condensation product from the above reaction. Throughout the addition of ethylene oxide, the pressure was again regulated in the range of 30 to 50 p.s.i.g. to maintain the temperature at about 120° C. When a total of 13.25 parts of ethylene oxide had been added to the reaction vessel, the bulk of its volume was occupied by liquid product. The flow of ethylene oxide was then stopped and the product mixture was digested for 30 minutes.

This product was a viscous, light amber colored liquid with exceptionally good foam suppressing properties. It was very soluble both in acetone and benzene and only slightly soluble (less than 1 percent by weight) in water. The product was analyzed and found to have the following properties:

| | |
|---|---|
| Density at 25° C. | 1.0225 |
| Refractive index at 20° C. | 1.455 |
| Viscosity in centipoises at 100° F. | 300 |
| Viscosity in centipoises at 210° F. | 44 |
| A.S.T.M. pour point, ° C. | −12 |
| Surface tension (100%) in dynes/centimeter | 33.6 |
| Surface tension of 0.1% solution in water in dynes/centimeter | 38.6 |
| Solubility in benzene at 25° C. (grams product per 100 grams benzene) | >100 |
| Percent OH, by acetylation | 1.64 |
| Average molecular weight (calculated from acetyl value) | 3110 |

Example 2

Some of the properties of several other glyceryl trihydroxy polyoxyalkylene ether products of the invention are listed in the accompanying table. All of these products were prepared in accord with the general procedure outlined in Example 1. The physical properties are all those of the product as taken from the reactor before neutralization.

Column 1 gives the ratio in which 1,2-propylene oxide was reacted with glycerol, viz. 40, 50 and 60 parts by weight of 1,2-propylene oxide per part by weight of glycerol. In column 2 is tabulated the weight ratio in which ethylene oxide was reacted with each of the three different glycerol-1,2-propylene oxide intermediate condensation products. Column 2 also includes values for each of the three glycerol-1,2-propylene oxide intermediate products prior to additions of the ethylene oxide.

Column 3 contains the hydroxyl values in percent by weight as determined by acetylation. Column 4 lists the approximate average molecular weights of these products as calculated from the hydroxyl values by reckoning three free hydroxyl groups per molecule.

In columns 5 through 10 are tabulated the viscosities in centistokes at the temperatures indicated, the A.S.T.M. pour points in degrees centigrade, the densities at the given temperatures, the refractive indexes ($n_D$) at 25° C., the surface tensions in dynes per centimeter of the product per se (100%), and the surface tensions of 0.10 percent solutions of the products in distilled water.

| Wt. Ratio of P.O. to Glycerol | Wt. Ratio of E.O. to P.O.–Glycerol | Wt. Percent OH | Mol. Wt. | Viscosity,[1] Centistokes | Pour Point, ° C. | Density, gms. per cm.³ | Refractive Index, $n_D$ at 25° C. | Surface Tension (100%), dynes per cm. | Surface Tension (0.1%), dynes per cm. |
|---|---|---|---|---|---|---|---|---|---|
| 40 | 0.0 | 2.13 | 2,394 | 258 (100° F.) | −1 | 1.034 | 1.4564 | 36.8 | 41.2 |
| 40 | 0.35 | 1.54 | 3,311 | 386 (100° F.) | | | | | |
| 50 | 0.0 | 1.78 | 2,865 | 296 (100° F.) | −4 | 1.030 | 1.4547 | 36.4 | 38.4 |
| 50 | 0.35 | 1.40 | 3,650 | 476 (100° F.) | | | | | |
| 60 | 0.0 | 1.70 | 3,000 | 328 (100° F.) | 30 | 1.019 | 1.4555 | 36.7 | 37.6 |
| 60 | 0.35 | 1.18 | 4,360 | 60.2 (210° F.) | | | | | |

[1] A.S.T.M. Method: D 445–52 T.

Example 3

This example clearly illustrates the foam suppressing characteristics of one of the new trihydroxy polyoxyalkylene ethers of glycerol prepared according to the procedure of Example 1 by reacting about 65 parts of 1,2-propylene oxide per part by weight of glycerol and about 0.20 part of ethylene oxide per part by weight of the intermediate glycerol-1,2-propylene oxide condensation product.

This product was tested as a foam suppressing agent in aqueous anti-freeze solutions of ethylene glycol. The aqueous anti-freeze test solutions were prepared by adding various weight percentages of the glyceryl trihydroxy polyoxyalkylene ether product to portions of a commercial anti-freeze formulation containing about 90 weight percent ethylene glycol and diluting the same with equal volumes of water. The tests were carried out in a glass tube four feet in length and one and five-eighths inches inside diameter. The glass tube was fitted at its base with a medium porosity glass frit which was connected to an adjustable air supply line. A 200 ml. sample of the aqueous anti-freeze test solution containing the trihydroxy polyoxyalkylene ether of glycerol was introduced into this tube and air was passed into the test solution through the glass frit at a rate such as to produce maximum foam. The results of the tests are expressed in inches of foam and are given in the following table opposite the concentrations of the foam suppressing product of the invention. These concentrations are given in percent by weight based on the ethylene glycol-containing anti-freeze solution prior to admixture with approximately 50 percent by weight of water.

| Trihydroxy Polyoxyalkylene Ethers of Glycerol, Wt. Percent | Foam Height, Inches |
|---|---|
| None | >48 |
| .01 | 1¾ |
| .022 | 1½ |
| .047 | ⅝ |
| .061 | ⅝ |
| .1 | ½ |

Example 4

The effectiveness with which the glycerol trihydroxy polyoxyalkylene ethers of the invention suppress foaming is clearly evident from the results of the following tests in which several of these new foam suppressing products are compared with various commercial anti-foam agents and other compounds not in accord with the invention.

These tests were carried out according to the procedure described in Example 3 employing 200 ml. test samples of the 50–50 volume percent anti-freeze-water solutions containing 0.1 percent by weight of the various products listed below.

These products are divided into three groups as follows: (A) foam suppressing products of the invention prepared according to the procedure of Example 1, (B) structurally related products not in accord with the invention, and (C) structurally unrelated products not according to the invention.

The products of the invention (category A of column 1) were all prepared according to the general procedure of Example 1. These products are identified in column 2 of the table according to the parts of 1,2-propylene oxide reacted per part by weight of glycerol and the parts of ethylene oxide reacted per part by weight of the intermediate glycerol-1,2-propylene oxide condensation product. For example, the product of Example 1 prepared by the condensation of 65 parts by weight of 1,2-propylene oxide per part of glycerol and 0.20 part by weight of ethylene oxide per part of the intermediate glycerol-1,2-propylene oxide condensation product is identified in column 2 as 65 PO–0.20EO.

Two structurally related products not in accord with the invention (category B) but prepared in accord with the procedure of Example 1 were tested and the results tabulated for purposes of comparison.

Several structurally unrelated products (not in accord with the invention) were also tested as foam suppressing agents, the identity of the products and the tests results appear in the table opposite category C.

A blank (D) on the 50–50 volume percent anti-freeze-water solution containing no additive is also included.

| Category | Identity of Test Compound | Foam Height in Inches |
|---|---|---|
| A | 40 PO–0.15EO | 1.0 |
| | 40 PO–0.35EO | 0.5 |
| | 55 PO–0.35EO | 0.0 |
| | 62.5 PO–0.35EO | 0.0 |
| | 65 PO–0.14EO | 0.9 |
| | 65 PO–0.20EO | 0.5 |
| | 65 PO–0.29EO | 1.4 |
| | 65 PO–0.35EO | 0.9 |
| B | 40 PO–0.49EO | 21 |
| | 62.5 PO–0.44EO | >48 |
| C | n-decyl alcohol | 11 |
| | light mineral oil | 18.5 |
| | cyclohexanol | 26.5 |
| | lauryl alcohol | >48 |
| D | blank | >48 |

That which is claimed is:

1. A composition having exceptional antifoam properties and consisting essentially of a mixture of trihydroxy polyoxyalkylene ethers of glycerol in which the polyoxyalkylene ether chains consist of a polyoxy-1,2-propylene portion adjacent to the glycerol nucleus and a polyoxyethylene portion remote therefrom, there being an average of at least 54 oxyalkylene groups per glycerol nucleus of which there are an average of at least 48 oxy-1,2-propylene groups present constituting greater than 66 mole percent of the total oxyalkylene groups.

2. A mixture of trihyrodxy polyoxyalkylene ethers of glycerol according to claim 1 wherein there is an average of at least 72 oxyalkylene groups per glycerol nucleus of which an average of at least 63 are oxy-1,2-propylene groups.

3. A composition having exceptional antifoam properties and consisting essentially of a mixture of trihydroxy polyoxyalkylene ethers of glycerol in which the polyoxyalkylene ether chains consist of a polyoxy-1,2-propylene portion adjacent to the glycerol nucleus and a polyoxyethylene portion remote therefrom, there being an average of from 72 to 195 oxyalkylene groups per glycerol nucleus of which there are an average of at least 63 oxy-1,2-propylene groups present constituting from 68 to 89 mole percent of the total oxyalkylene groups.

4. A mixture of trihydroxy polyoxyalkylene ethers of glycerol according to claim 3, the average molecular weight of the glycerol-polyoxy-1,2-propylene portions of said ethers being at least 2394, as determined by hydroxyl number.

5. A mixture of trihydroxy polyoxyalkylene ethers of glycerol according to claim 3 wherein the weight percent OH as determined by acetylation is in the range of from about 1.1 to about 2.1 and the viscosity is in the range of from about 250 centistokes at 100° F. to about 60 centistokes at 210° F.

6. A composition having exceptional antifoam properties and consisting essentially of a mixture of trihydroxy polyoxyalkylene ethers of glycerol, said compounds containing in their structure oxyethylene groups, oxypropylene groups, and a glycerol nucleus; the compounds being characterized in that the oxypropylene groups are present in polyoxypropylene chains that are attached to the glycerol nucleus, one polyoxypropylene chain being attached to each oxygen atom of the glycerol nucleus, thereby constituting a polyoxypropylene glycerol polymer portion; the oxyethylene groups being present in polyoxyethylene chains, one polyoxyethylene chain being attached to the end of each polyoxypropylene chain; the average molecular weight of the polyoxypropylene glycerol polymer portions in the compounds of the mixture being at least 2394, as determined by hydroxyl number, and the oxyethylene groups being present in an amount equal to from 0.1 to 0.4 part by weight per part of the polyoxypropylene glycerol polymer portions.

7. A mixture of trihydroxy polyoxyalkylene ethers of glycerol according to claim 6 wherein there is from 0.15 to 0.35 part by weight of oxyethylene groups per part of the polyoxypropylene glycerol polymer portions.

8. A mixture of trihydroxy polyoxyalkylene ethers of glycerol according to claim 6 wherein the average molecular weight of the polyoxypropylene glycerol polymer portions in the mixture is in the range of from 2394 to 3000.

9. A composition having exceptional antifoam properties and consisting essentialy of a mixture of trihydroxy polyoxyalkylene ethers of glycerol, each polyoxyalkylene chain of which consists of oxy-1,2-propylene units adjacent to the glycerol nucleus and oxyethylene units remote therefrom, said mixture having an average of from 30 to 80 parts by weight of polyoxy-1,2-propylene units per part of glycerol and an average of from about 0.1 up to about 0.4 part of polyoxyethylene units per part of the glycerol-polyoxy-1,2-propylene portion.

References Cited in the file of this patent
UNITED STATES PATENTS 2,448,664    Fife et al.    Sept. 7, 1948
2,674,619    Lundsted    Apr. 6, 1954

OTHER REFERENCES

"Pluronics," Wyandotte Chem. Corp., Wyandotte, Mich., printed September 1952, received in Patent Office January 2, 1953, 12 pp.

Chem. and Eng. News, Jan. 30, 1956, p. 478.